United States Patent [19]
Ehrreich

[11] Patent Number: 4,592,961
[45] Date of Patent: Jun. 3, 1986

[54] PARTICLE FILLED FLEXIBLE COATING COMPOSITION OF AROMATIC POLYESTER AND VINYLIDENE CHLORIDE COPOLYMER

[75] Inventor: John E. Ehrreich, Acton, Mass.

[73] Assignee: Ercon, Inc., Waltham, Mass.

[21] Appl. No.: 658,575

[22] Filed: Oct. 9, 1984

[51] Int. Cl.$^4$ .................. B32B 27/06; B05D 3/02; B22F 3/00
[52] U.S. Cl. .................. 428/480; 252/62.53; 252/62.55; 252/502; 252/511; 252/512; 252/514; 427/122; 427/123; 427/125; 427/127; 427/129; 427/132; 428/327; 428/900; 524/431; 524/439
[58] Field of Search .............. 427/171, 122, 123, 125, 427/127, 132, 129, 101, 282, 393.5, 445; 252/502, 511, 512, 514, 519, 62.53, 62.55; 428/480, 900, 327; 524/431, 439

[56] References Cited

U.S. PATENT DOCUMENTS 3,978,378 8/1976 Tigner et al. .................. 252/512 X
4,351,746 9/1982 Parish et al. .................. 252/511
4,371,459 2/1983 Nazarenko .................. 252/514

Primary Examiner—Thurman K. Page
Attorney, Agent, or Firm—Andrew F. Kehoe

[57] ABSTRACT

A coating composition having surprisingly superior physical properties, particularly when highly-filled with small particles and bonded to a flexible film of a polymeric substrate. The composition consists essentially of (1) a homogeneous binder formed of relatively hard, high-tensile, aromatic polyester compounded with a vinylidene chloride copolymer such that the copolymer serves as means to increase the elongation, toughness and heat resistance of the binder and (2) the filler. The process of forming such a binder comprises formation of a homogeneous polymeric solution wherein each of the polymers is intimately distributed within the same solvent phase.

23 Claims, No Drawings

PARTICLE FILLED FLEXIBLE COATING COMPOSITION OF AROMATIC POLYESTER AND VINYLIDENE CHLORIDE COPOLYMER

BACKGROUND OF THE INVENTION

This invention relates to new coating compositions and, particularly, to a new binder system for use with highly-filled, particle-bearing coatings wherein it is desired to achieve abrasion resistance without excessive brittleness and loss of flexibility, particularly on repeated creasing.

The following summary of the background is necessarily made with hindsight of Applicant's invention. The publications were discovered using full-text computerized searching methods and Applicant emphasizes that one skilled in the pertinent art of making highly-filled coating systems would not have discovered some such publications in the art except by use of full-text searching techniques which assured mere combinations of key words relating to Applicant's invention would turn up references from non-analogous technical areas. One example of such non-analogous art is U.S. Pat. No. 3,912,511 which discloses an unfilled, ultra-thin (2-micron and no more than 5 micron) film of a polyester/-polyurethane/vinylidenechloride-acrylonitrile copolymer blend. That ultra-thin film, of resin only, was utilized unfilled to protect a metal-cylinder against abrasion, and does not address problems associated with of highly-filled, particulate-bearing compositions of the type used on flexible substrates wherein the particles themselves are often several microns or more in maximum dimension.

U.S. Pat. Nos. 4,131,717 and 4,425,263 disclose the use of speciality aromatic polyester polymers as binders for use in highly-filled coating systems. The former patent relates to magnetic tape; the latter patent relates to silver-filled conductive coatings.

A great deal of other work has been done by various inventors attempting to provide binder systems which would provide highly-filled compositions with an improved combination of such properties as adhesion of the coating to flexible resinous substrates, abrasion resistance of the coating, toughness (the area under the pertinent portion of a stress/strain curve of a given coating system) abrasion resistance, and flexibility. Improvements in such systems were to be welcomed in a variety of applications where the physical properties of coatings were limiting the use, and the abuse, which could be tolerated by such products as electrically conductive compositions used as conductors in membrane switches, magnetic coatings on floppy disk recording media, and the like. However, even the best of earlier systems generally required use of such expensive and troublesome solvents as dimethylformamide, tetrahydrofuran or the like.

SUMMARY OF THE INVENTION

It is a principal object of the invention to achieve flexible coatings comprising an organic binder highly filled with particles while achieving an excellent combination of such properties as toughness, abrasions resistance, and ability to adhere to flexible organic substrates.

It is also an object of the invention to achieve readily-sprayable, particle-filled coatings with excellent physical properties such as toughness and abrasion resistance even when such coatings are applied to rigid surfaces.

Another object of the invention is to provide such systems which can be utilized in a wider variety of solvents, particularly those which are less expensive and less volatile.

A further object of the invention is to provide coating systems as described above having improved thermal properties and processing characteristics.

Other objects of the invention will be obvious to those skilled in the art on their reading of this invention.

The above objects have been achieved by use of a binder system which comprises a careful compounding of (a) high-tensile thermoplastic, speciality aromatic polyesters with (b) vinylidene chloride polymer (VCP), usually a copolymer of vinylidene chloride, e.g. vinylidene chloride/vinyl chloride copolymers known in the art. The VCP, properly incorporated into a polyester-bearing composition yields a film-forming composition of improved properties, one which conserves much of the strength, abrasion resistance, and adhesion characteristics of the polyester resin. Particularly surprising, are the excellent film-forming characteristics of the binder compositions. These characteristics allow excellent properties of compositions even when the binder is extended such that functional filler particles, e.g. electroconductive particles, of a average diameter of 1 to 15 microns (but often of only 1-2 microns and even smaller) are present in quantities allowing particle-to-particle contact. The same ability to tolerate very high loadings of very small particles while maintaining good physical properties is also exhibited in other such heavily loaded systems as paper coatings (clay filler) and magnetic recording coatings (iron oxide and chromium dioxide fillers). Also carbon black can be used in such systems to provide superior smooth coatings which allow low noise electrical contact to be made with the coatings.

Polymers (a) and (b) must be compounded with special care to achieve the desired homogeneous binder. This homogeneous nature may be identified by the fact that the two polymers, when combined into a solvent mixture, do not exhibit a cloudy appearance but appear to be a single clear solution. While there are a number of different solvent combinations which can provide such a solution, it has been found suitable to dissolve the polyester in isophorone or cyclohexanone. The VCP polymer (when used in a readily-soluble, commercially-available and, hence, preferred acrylonitrile-copolymer form) is conveniently dissolved in isophorone. In normal practice, the two polymers can be conveniently dissolved separately, then stored separately if desired, and finally mixed together just before coating. Indeed there is a substantial advantage in using this segregation procedure whenever a contaminant-bearing or reactive metal flake product is used as a filler and storage of the coating is contemplated under conditions which are not carefully controlled as to time and temperature. The flake, in such a case, should be segregated with the polyester solution component to avoid deleterious reactions between the flake-bourne contaminants and the VCP. The filler, and whatever other adjuvants are required, may be mixed into the system to form the coating system. Those solvent systems described above are particularly efficient and allow reasonably fast processing.

Normally, the polymers can be effectively dissolved for blending with one another at concentrations of from 10 to 40% by weight. However, it will be understood by those skilled in the art that the amount of solvent used in the final composition will usually depend upon the viscosity requirement of a particular coating-application process and the nature and quantity of fillers used in the application.

The speciality polyesters are advantageously selected from thermoplastic, linear, high-tensile, aromatic-polyester resins such as those commercial products sold by Goodyear Tire and Rubber Company under the trade designation Vitel. Among the more advantageously-used resins are such grade designations as PE-200, PE-100, PE 200-D, PE-222 and VPE-5066A. All of these materials are said by their supplier to have elongations to break of 10% or less, to have tensile strengths of about 5000 psi or higher, and glass transition points of about 100° F. or higher. The more preferred materials have glass transition points of 140° F. or higher. Specialty aromatic polyesters having tensile strengths of 3000, elongation of up to 50%, and glass transition temperatures of 100° F. or higher are usually preferred in the practice of the invention.

The literature reports that, typically, such specialty polyester resins now available are polycondensation products of an aromatic dicarboxylic acid such as isophthalic or terephthalic acid with a dihydroxy alkane such as ethylene or propylene glycol. However, the precise molecular building blocks are believed to be relatively unimportant except as to the convenience with which the desired physical properties are achieved.

The vinylidene chloride copolymer is best introduced into the polyester by use of a relatively easily soluble copolymer such as that sold by Dow Chemical Company under the trade designation SARAN F-310. (This particular material comprises acrylonitrile-derived groups.) If one is willing to go to the trouble of dissolving less-readily soluble forms of these copolymers, they will also work well, providing only that they (1) allow formation of a homogeneous polymeric binder resin with the aromatic polyester and (2) are not substantially poorer in physical properties than the SARAN F-310 product when utilized as a co-resin in the novel binder systems disclosed herein.

The specialty aromatic polyesters are readily soluble in a large number of solvents. However, to achieve the required degree of compatibility of polymers (a) and (b) in the final solvent vehicle particular care should be taken in choosing solvents for both vinylidene-chloride copolymer and the polyester.

It is to be noted that it is believed to be unknown in the art to provide such particle-filled coatings of such an excellent combination of physical properties utilizing such relatively inexpensive solvents having such high boiling points, e.g. boiling points of over 100° C. Thus such ketonic solvents as isophorone, cychlohexanone, acetophenone, and the like may be utilized and are of particular advantage when used at high coating speeds with transfer rolls, because of the relatively slow evaporation characteristics which they impart to the solvent component of the coating formulation.

An easy way to test for sufficient homogeneity is to prepare solutions at practical concentration of the polymers, say 10 to 40%, and then blend them together. (The blending is best done in such a way to avoid the incidental formation of micro-bubbles which could interfere with evaluation of the homogeneity of the solution). These concentrations allow the molecules to avoid undue interaction before they are highly solvated and dispersed. Often a substantial amount of cloudiness or haze will be evident immediately if there is to be a problem with homogeneity. However, it is desirable to evaporate the solution to dryness while monitoring it for homogeneity. Many of the best film-forming polymeric binders will remain clear until substantially all of the liquid vehicle is removed. The present inventor has found this screening technique satisfactory, but it should also be noted that the procedures and principles of solvent selection for forming polymer solutions and set forth in published Polymer handbooks known to the art and in such articles as "Three-Dimensional Approach to Solubility" by Crowley et al (Journal Paint Technology, May 1966) and "The Three-Dimensional Solubility Parameter -Key to Paint Compound Affirmities" by Hansen (Journal of Paint Technology, February 1967) are also useful in selecting particular solvents for use in forming homogeneous coating solutions according to the invention.

In general, the particle-filled coating systems according to the present invention are of utility in the formation of coatings of about 100 microinches (0.0001 inch). With such thin coatings, the excellent adhesion characteristics of the coatings are very important. However, the improved properties relating to crease resistance and flexibility become more critical as the coating thickness is increased above 300 microinches.

It is noted that the coating formulation of the invention have excellent high temperature characteristics. The polyvinylidene chloride copolymer imparts are not superior film-forming characteristics but also an improved high-temperature performance. Thus the most advantageous binder systems are those which have at least the 100° F. transition temperature and 3000 psi tensile.

ILLUSTRATIVE EMBODIMENTS OF THE INVENTION

In this application there is described preferred embodiments of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

EXAMPLE 1

The following materials are thoroughly mixed:

| Material | Parts by weight |
| --- | --- |
| Polyester(Vitel PE-200) | 2 |
| Silver Flake (Metz No. 7) | 29 |
| Isophorone solvent | 8 |

The polyester is dissolved in the isophorone, then the flake is dispersed into the resulting solution.

Thereupon a solution is formed as follows:

| Material | Parts by weight |
| --- | --- |
| Polyvinylidene Chloride Copolymer | 2 |

| Material | Parts by weight |
|---|---|
| (SARAN F310) | |
| Isophorone | 4 |

The polyester and PCC bearing solution mixtures are combined and contain 64% by weight of silver metal.

The coating was tested using a 0.04-inch wide by 2-inch long patterns coated through a 200-mesh screen onto 5-mil thick film of a flexible biaxially-oriented polyester film sold under the tradename MYLAR (EL type) by the Dupont company. After drying in an oven at 100° C. for 30 minutes, the electrical resistance of the film was measured at 1.95 to 2.35 ohms between the ends of the 2-inch long strip. The dried coating thickness was 0.0004 to 0.0005 inches.

The coatings exhibited excellent bonding to the polyester substrate, excellent crease resistance, excellent hardness and wear resistance: Particularly noteworthy was the combination of properties, especially the combination of hardness and crease resistance.

The heat aging of the mixture containing the silver flake, both polymers and isophorone left much to be desired. This heat aging was in the form of an accelerated shelf-life testing procedure whereby the material was aged for 15 hours at 80° C. in sealed containers. The material gelled completely and was no longer useable as a screenable conductive ink. Consequently, it is recommended that such formulations be refrigerated during storage or that the two polymer bearing mixtures be segregated during any prolonged storage in noncontrolled environments.

EXAMPLE 2

When the metal flake was omitted from the formulation of Example 1, the heat aging of the solution containing the two polymers for 15 hours at 80° C. had no appreciable effect upon the viscosity of the resultant composition.

EXAMPLE 3

When the polyester-bearing mix of Example 1, i.e. Vitel PE-200, isophorone and silver, was heated for 15 hours at 80° C., there was no appreciable effect on viscosity. Also, when 19.5 parts by weight of this same mixture was mixed with three parts by weight the polyvinylidene chloride copolymer mixture of Example 1, a good viscosity grade ink achieved similar to the unaged mixture of Example 1.

EXAMPLE 4

A mixture was prepared from the following components:

| Material | Parts by weight |
|---|---|
| Polyester (Vitel PE-200) | 3.6 |
| Isphorone | 14.4 |
| 33% solution of SARAN F310 in Isophorone | 1.2 |

Into 9.6 parts by weight of the indicated mixture were mixed 14.45 parts by weight of silver flake (Metz No. 7). The resultant composition had 60.1% by weight of silver dispersed in a polymeric binder solution which was 1 part polyvinlyidene copolymer to nine parts specialty polyester.

The material coated well through screens as did the material of Example 1. Electrical resistance of dried coatings 3.2 to 3.6 ohms per 2-inch lengths measured as described in Example 1. They had excellent physical properties and bonding to the polyester film substrate.

EXAMPLE 5

A composition was produced using 90% by weight of the polyvinylidene chloride/acrylonitrile copolymer and 10% by weight of the specialty polyester:

| Material | Parts by weight |
|---|---|
| Polyester | 0.4 |
| Isophorone | 1.6 |
| Polyvinylidene chloride copolymer | 3.6 |
| Isophorone | 7.2 |
| Additional Isophorone | 6.4 |

Into 9.6 parts by weight of the indicated mix was intimately dispersed a quantity of 14.45 of silver flakes.

When processed and tested according to Example 1, these compositions exhibited electrical resistivities of from about 2.1 to 2.0 ohms. They had excellent physical properties and bonding as described in Example 1 above.

EXAMPLE 6

A composition was prepared comprising 64% by weight of Metz No. 7 silver in a binder solution which itself was all specialty polyester vehicle, i.e. 25 weight % solution of Vitel PE-200. The electrical resistance of the screened and dried coatings after they are dried measured at 3 to 4 ohms per 2-inch length. The combination of physical properties (i.e. thermal resistance, crease resistance, and abrasion resistance) were inferior to the physical properties obtained when the binder was a specialty polyester in homogeneous mixture with polyvinylidene chloride copolymer.

EXAMPLE 7

Using the procedures described in the above examples, a coating composition was prepared which contained 60% by weight of silver flake in a 25% solids binder solution. The binder solution contained 50:50 blend of the specialty polyester and polyvinylidene chloride copolymer.

When screened, dried and tested as in Example 1, the resistivities were 2.55 to 2.7 ohms. Excellent physical properties were realized on the 5-mil Mylar substrate.

EXAMPLE 8

When Example 7 was repeated, but increasing the silver content to 68.8 weight % silver in the ink, the resistivity was measured at 2.0 to 2.35 ohms.

EXAMPLE 9

The following composition was prepared and dispersed with the aid of a mill.

| Material | Parts by weight |
|---|---|
| 20% solution of Vitel PE-200 in isophorone | 25 |
| Additional Isophorone | 60 |
| Iron oxide pigment, HR280 | 55.3 |

Twenty parts by weight of the above dispersion was mixed with 2.14 parts by weight of a polyvinylidene chloride copolymer composition comprising 1 part copolymer to 2 parts of isophorone.

The resulting coating composition was applied, through a 240 mesh screen to a Mylar substrate. The coating was dried for thirty minutes at 100° C., a magnetic-recording coating was formed having a excellent properties, particularly excellent abrasion-resistance.

EXAMPLE 10

The following carbon-black bearing mixture was prepared and dispersed with a mill:

| Material | Parts by weight |
| --- | --- |
| 20% solution of Vitel PE-200 in isophorone | 50 |
| Additional isophorone | 40 |
| Carbon Black(Vulcan XC72R)* | 10 |

Twenty parts by weight of the mixture was further mixed with 6 parts by weight of polyvinylidene chloride copolymer solution bearing one part of the copolymer and two parts of isophorone.

When applied through a 240-mesh screen to the polyester film described above and dried at 100° C. for 30 minutes, the coatings exhibited a resistivity of 1188 ohms per square. Adhesion to the substrate, hardness and crease resistance were all excellent.

EXAMPLES 11–14

Specialty polyesters sold under the trade designation VPE-5066A and VPE 5987A are each utilized, as substitutes for the specialty polyester PE 200 in each of Examples 1 and 5. Each of the four coatings have the desirable properties of those of Examples 1 and 5.

Metz No. 7 denotes a silver flake-shaped powder sold by Metz Metalurigical Co. of Kearney, N.J. characterized by apparent density (ASTM B32-970) 18.0 to 33.0 grams/cubic inch; top density or TAP-PAK volometer 2.0 to 3.3 grams per cc. Particle size (photomicroscopy) average thickness times average diameter is 3 to 10. Weight loss at 350° F. in furnace for 30 minutes is 0.7%, maximum; at 1000° F., another 0.5% of weight is lost.

PE 200 is said by its supplied to have a glass transition temperature of 71° C. (160) a tensile strength of 7800 psi and a 3% elongation to break.

It is also to be understood that the following claims are intended to cover all of the generic and specific features of the invention herein described and all statements of the scope of the invention which might be said to fall therebetween.

What is claimed is:

1. A solid composition comprising a substantial volume of particles held in particle-to-particle contact within an organic binder wherein said binder consists of at least 80% of a blend of (a) thermoplastic aromatic polyester resin and (b) a vinylidene chloride copolymer.

2. A composition as defined in claim 1 wherein said aromatic polyester resin incorporated into said homogeneous organic binder is characterized by a glass transition temperature of at least about 100° F. and a tensile strength of at least 3000 psi.

3. A composition as defined in claim 1 wherein said aromatic polyester resin incorporated into said homogeneous organic binder has an elongation to break of about 10% and a minimum tensile strength about 5000 psi.

4. A composition as defined in claim 3 wherein the glass transition temperature of said polyester resin component is about 140° F. or higher.

5. A composition as defined in claim 1 wherein said vinylidene chloride copolymer comprises a major proportion by weight of vinylidene chloride units and a minor proportion by weight of acrylonitrile units.

6. A composition as defined in claim 1 wherein said particles are electroconductive particles present in sufficient quantity to impart electroconductivity to said composition.

7. A composition as defined in claim 6 wherein said particles are conductive carbon particles.

8. A composition as defined in claim 6 wherein said particles are silver flake.

9. A composition as defined in claim 6 wherein said particles are electroconductive metal particles.

10. A composition as defined in claim 1 wherein said particles are magnetic particles.

11. A composition as defined in claim 1 wherein the quantity of vinylidene chloride polymer is sufficient to modify the basic elongation to break property of said polyester polymer by at least 100%.

12. A liquid coating formulation comprising a homogeneous solution of solvent and
   (1) an aromatic polyester resin and a vinylidene chloride copolymer; and
   (2) a quantity of particles having an average maximum particle diameter of less than about 15 microns said quantity being effective to form particle-to-particle contact on evaporation of said solvent; and characterized by said solution remaining substantially homogeneous as said solvent is evaporated.

13. A coating formulation as defined in claim 12 wherein said solution comprises isophorone, or a mixture of isophorone solvents and cellosolve acetate, or cyclohexanone.

14. A coating formulation as defined in claim 12 wherein said aromatic polyester resin is characterized by a glass transition temperature of at least 100° F., and a tensile strength of at least 3000 psi.

15. A coating formulation as defined in claim 12 wherein said resin and copolymer are selected such that, on drying, they will together have a glass transition temperature of at least 100° F. and a tensile strength of at least 3000 psi.

16. A coating formulation as defined in claim 13 said aromatic polyester resin incorporated into said homogeneous organic binder has an elongation to break of at about 10% and a minimum tensile strength about 5000 psi.

17. A coating formulation as defined in claim 12 wherein said chloride copolymer comprises a major proportion by weight of vinylidene chloride units and a minor proportion of weight of acrylonitrile units.

18. A coating formulation as defined in claim 11 wherein said particles are at least one of electroconductive, thermally-conductive, or ferromagnetic in character.

19. A process for making coated products comprising an organic substrate and a coating formed of a filler-loaded organic resin binder, said process comprising the steps of
   (a) forming a homogeneous solution comprising an aromatic polyester resin and a vinylidene chloride copolymer,
   (b) loading filler into said solution, (c) coating said filler-loaded solution onto said substrate and
(d) evaporating said solution to substantial dryness while maintaining the homogeneity of said solution.

20. In an improved coated product comprising a biaxially-oriented polyester film substrate and a thin particle-loaded organic resin coating thereover, the improvement wherein said coating is formed of the coating composition defined by claim 1.

21. A two-component polymer system for making coatings composition an effective amount of conductive metal flake or carbon black in a quantity effective to render said coatings electroconductive, solid compositions formed of said two-component polymer system comprising essentially of
(a) a first liquid composition comprising said metal flake or black dispersed and suspended in a thermoplastic aromatic polyester resin polymer solution which is relatively non-reactive with said flake as determined by its contributing no substantial viscosity rise when said first composition is aged for 15 hours at 80° C.,
(b) a second liquid composition formed of an ethylenic polymer of vinylidene chloride or copolymers comprising vinylidene chloride and a solvent therefor, said second liquid composition showing no substantial rise in viscosity of said second liquid composition when it is heated at 15 hours at 80° C. along.

22. A system as defined in claim 21 wherein said metal flake or black incorporated into said first liquid composition comprises a solvent-activatable organic contaminant material upon the surface thereof.

23. A system as defined in claim 21 wherein said polymer of said second composition is a vinylidenechlorideacrylonitrile copolymer.

* * * * *

UNITED STATES PATENT AND TRADEMARK OFFICE
CERTIFICATE OF CORRECTION

PATENT NO. : 4,592,961

DATED : June 3, 1986

INVENTOR(S) : John E. Ehrreich

It is certified that error appears in the above-identified patent and that said Letters Patent is hereby corrected as shown below:

Column 7, line 19, after "Carbon Black (Vulcan XC72R)*   10 "
insert -- *Vulcan XC72R is a furnace carbon black sold by Cabot Corporation. It is used in the non-pelleted form.--.

Signed and Sealed this

Second Day of September 1986

[SEAL]

Attest:

DONALD J. QUIGG

Attesting Officer

Commissioner of Patents and Trademarks